United States Patent [19]

Malinowski

[11] 4,180,742

[45] Dec. 25, 1979

[54] DETECTOR WITH SUPERVISORY SIGNAL FROM MONITOR CELL

[75] Inventor: William J. Malinowski, Pembroke, Mass.

[73] Assignee: Chloride Incorporated, Tampa, Fla.

[21] Appl. No.: 890,064

[22] Filed: Mar. 27, 1978

[51] Int. Cl.[2] .............................................. G01N 21/26

[52] U.S. Cl. .................................... 250/574; 340/630; 356/438

[58] Field of Search ................ 356/437, 438; 250/573, 250/574, 575, 209, 210, 214 R; 340/630

[56] References Cited

U.S. PATENT DOCUMENTS

| | | | |
|---|---|---|---|
| 3,879,718 | 4/1975 | Roberts | 340/630 |
| 4,025,915 | 5/1977 | Enemark | 340/630 |
| 4,053,785 | 10/1977 | Lee et al. | 250/574 |

*Primary Examiner*—David C. Nelms

*Attorney, Agent, or Firm*—Robert E. Ross

[57] ABSTRACT

A smoke detector system utilizing remote detectors of the photo-electric type connected to a central control panel. In one embodiment means is provided for monitoring both the signal lead and power lead, and in another embodiment, means is also provided for monitoring the condition of the detector light source. A normally illuminated compensating cell is provided in series with the smoke detection cell, with the bottom of the compensating cell being maintained a predetermined voltage above ground to provide a monitor voltage at the junction of the cells. The output signal lead is connected to the junction of the compensating cell and the smoke cell, and feeds a high impedence input amplifier, the output of which goes to the control panel. Means is provided at the panel for responding to the presence of an alarm signal on the signal lead or the absence of the monitor voltage which might be caused by a break in the signal lead, or the power lead. In the otherembodiment, means is provided for causing a loss of the monitor voltage on failure of the light source.

6 Claims, 3 Drawing Figures

DETECTOR WITH SUPERVISORY SIGNAL FROM MONITOR CELL

BACKGROUND OF THE INVENTION

Smoke detectors of the photoelectric type are often used in fire alarm system installations, where a plurality of remote detectors are connected to a central control panel. It is often desirable in such systems to provide means for providing a standby voltage on the signal lead, which is appreciably lower than the alarm voltage, with means at the control panel for indicating the absence of the standby voltage. It has also been desirable to provide means for indicating the condition of the smoke detector light source.

Smoke detectors of the photo-electric type are often provided with a compensating cell connected in series with the smoke detector cell. The compensating cell is constantly exposed to light from the detector light source, whereas the detector cell is exposed to light from the light source only when smoke appears in the light beam and reflects smoke onto the detector cell. The output voltage for actuating an alarm is taken from the junction between the cells.

SUMMARY OF THE INVENTION

A smoke detector unit for connection to a central control panel is provided with a smoke detector cell and a compensating cell connected in series, and a signal lead is taken from the junction of the two cells. Means is provided for maintaining, through the compensating cell, the cell junction voltage at some predetermined stand-by voltage above ground, which voltage is less than the voltage that appears at the junction when the smoke concentration is such that the alarm is to be sounded.

Means may be provided at a central control panel for actuating an alarm when a predetermined higher voltage appears on the signal lead, and for actuating a trouble indicator on failure of the stand-by voltage. In one embodiment, the system provides an indication of a break in either the signal or the power leads between the detector and the control panel by dropping the stand-by voltage on the signal lead to zero. In another embodiment means is provided for dropping the stand-by voltage to zero on failure of the light source.

DESCRIPTION OF THE ILLUSTRATED EMBODIMENT

Figure 1:
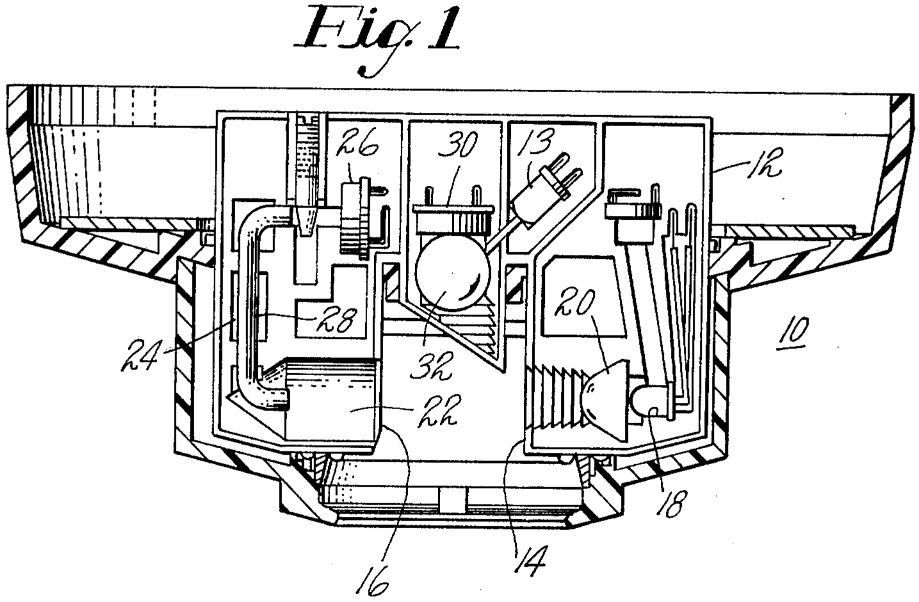
FIG. 1 is a view in elevation, partly in section, of a smoke detector assembly of a type with which the invention may be used.

Referring to the drawing, there is illustrated a smoke detector unit 10 embodying the features of the invention. The detector unit may include a support block 12 having a medial portion 13 and forwardly extending portions 14 and 16 at each end of the medial portion. The block 12 may be formed of two similar halves with suitable recesses which, when the halves are assembled, form cavities to receive optical and electrical components.

A suitable cavity in the forwardly extending portion 14 receives a light source 18 and lens 20, so arranged that a light beam is projected across the space between the forwardly projecting portion into a light trap 22 in the portion 16.

In the illustrated embodiment of the detector housing, a recess is also provided to form a channel 24 leading from the light trap 22 to a separate cavity receiving a compensating photo-cell 26. A light pipe such as an acrylic rod 28 is disposed in the channel 24 to conduct light from the light trap 22 to the compensating cell 26.

A cavity is also provided in the medial portion for receiving a smoke detector cell 30 and lens 32. Smoke appearing in the space between the forwardly extending portions 14 and 16 is illuminated by the light source 18, and light reflected from the smoke particles falls onto the photo-cell 30.

Figure 2:
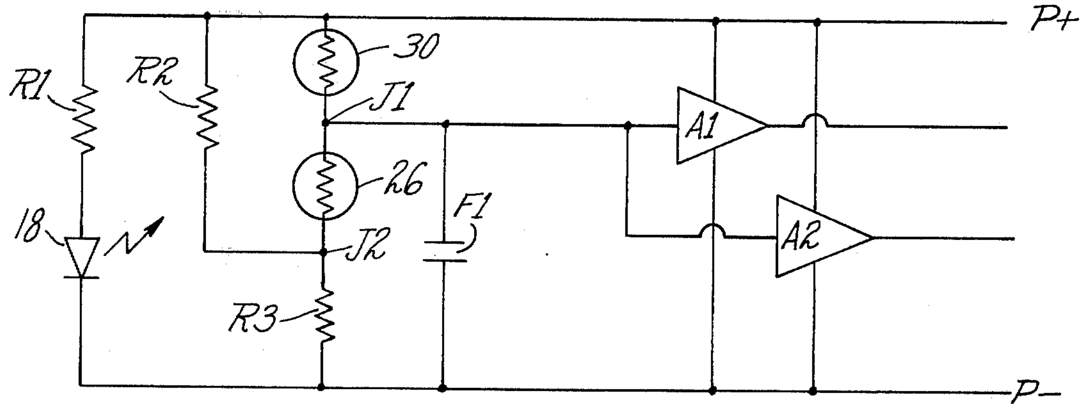
FIG. 2 is a schematic representation of an electronic circuit embodying the features of a first embodiment of the invention, shown connected to amplifiers, which may be at a remote control panel.

Referring to FIG. 2 of the drawing, the light source 18 is connected across a power source P through a limiting resistor R1. The smoke cell 30 is connected to the positive side of the power source, the other terminal thereof being connected to the compensating cell 26 at junction J1, with the other terminal of the compensating cell 26 being connected to the junction J2 of resistors R2 and R3 connected in series across the power source.

In the embodiment of FIG. 2, the junction J1 is connected to the negative side of the power source by a capacitor F1, having a suitable valve to reduce the effect of stray AC voltages, and J1 is also connected to the inputs of amplifiers A1 and A2, which may be at a remote control panel. Amplifiers A1 and A2 have characteristics to be described hereinafter.

In the embodiment of FIG. 2, the junction J1 is connected to the negative side of the power source by a capacitor F1 having a suitable valve to reduce the effect of stray AC voltages and J1 is also connected to the inputs of amplifiers A1 and A2, having characteristics to be described hereinafter.

During normal stand-by operation, under conditions of no smoke, the compensating cell 26 is illuminated by the light source 18 and maintained at a lower resistance than that of cell 30 which is maintained in darkness by the detector housing.

The voltage divider formed by resistors R2 and R3 maintains the junction J2 at a predetermined percentage of the power source voltage. Because of the conductivity (when the light is energized) of cell 26, the junction J1 and therefore the amplifier inputs are also maintained at a monitor voltage which is a percentage of supply voltage.

The amplifier A2 is designed to be responsive to the loss of the monitor voltage at the input thereof from junction J1 to energize a trouble alarm T, and the amplifier A1 is responsive to a predetermined voltage higher than the volts to actuate an alarm K for indicating the presence of smoke.

In the illustrated embodiment, the power source may be 15 volts D.C., and the resistors R2 and R3 selected to provide a monitor voltage of 3 volts at the junction J2. The resistance of the compensating cell in a typical embodiment, will be of the order of 10 megohms, and, under no-smoke condition, the resistance of the smoke cell 30 will be of the order of 500 megohms, due to the stray light in the housing from the light source 18 and leakage of ambient light.

When smoke is present in the housing, the light reflected therefrom onto the cell 30 lowers its resistance, increasing the voltage at J1 and at the amplifier inputs. When the voltage at J1 reaches a predetermined value corresponding to a predetermined concentration of smoke, the voltage at J1 and hence at the amplifier inputs is great enough to provide an output of amplifier A1 to energize the alarm K.

In the case either the signal lease or the power lead is broken, the voltage at the input of amplifier A2 drops to zero actuating the trouble alarm T.

In the case of failure of the light source 18, the resistance of cell 26 rises to substantially the same resistance as that of cell C1, (which also rises due to the loss of stray light from the light source 18). The voltage at J1 therefore rises to a percentage of supply voltage determined by the value of resistor R3. Since R3 is of considerably lower resistance than that of the cells 26 and 30 in the dark condition, the junction J1 will rise to a value that exceeds the voltage necessary at amplifier A1 to actuate the alarm.

Figure 3:
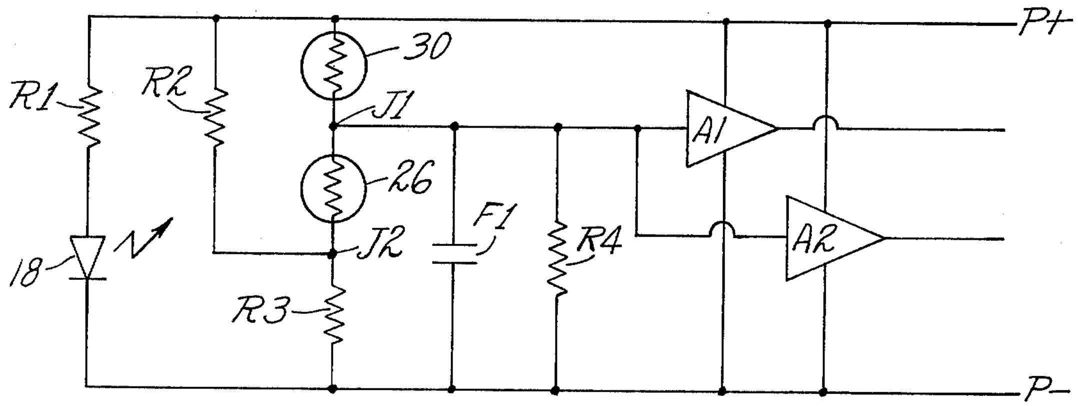
FIG. 3 is a schematic representation of a modified form of the electronic circuit of FIG. 2.

If it is desired that the failure of the light source be indicated by some means other than by actuation of the smoke alarm, the circuit of FIG. 3 may be used, which circuit is identical to that of FIG. 2, with the exception of the addition of the resistor R4 between junction J and the negative side of the power supply.

The resistor R4 is of the order of 10 times the resistance of that of the cell C2 when illuminated by the light 18, for example, 100 megohms, to avoid interfering with the compensating effect of the cell C2. The presence of the resistor R4 causes the input signal to the amplifier A2 to disappear on failure of the light source 18 in the following manner. When the light 18 is extinguished the resistance of cells 26 and 30 rise as previously described, to a value in excess of 500 megohms since the resistance of R4 is of the order of 100 megohms, the voltage at junction J1, and therefore at the input of amplifier A2 approaches zero. As previously stated, the loss of an input to amplifier A2 causes the trouble alarm to be energized.

Each detector unit may be powered in parallel by power leads from a central control panel, with individual signal leads connecting each detector to the panel, or the signal lead may be connected to a signal generating unit at each detector, to provide a coded output signal on the power lead, as is well known in the art.

Since certain modifications in the illustrated embodiments may be made by one skilled in the art without departing from the scope of the invention, it is intended that appropriate matter contained herein be interpreted in an illustrative and not a limiting sense.

I claim:

1. A detector for providing a signal when a medium to be detected reaches a predetermined concentration, comprising a light source, a first photo-resistive device positioned to receive substantially only light from the light source reflected from the medium, a second photo-resistive device positioned to receive light directly from the light source, power leads and a signal lead, said first and second photo-resistive device being connected in series through a first junction, said second photo-resistive devices being connected in series through a second junction with a resistor, the photo-resistive devices and the resistor being connected across the power leads, the signal lead being connected to the first junction, and means maintaining said second junction at a voltage which is a predetermined percentage of the power lead voltage, whereby a stand-by voltage appears at the first junction when said second photo-resistive device is illuminated the electrical characteristics of the components being such that said stand-by voltage is appreciably different in value from the voltage appearing at the first junction when the first photo-resistive device is exposed to light reflected from the medium at said predetermined concentration.

2. A detector as set out in claim 1 in which the voltage at said second junction is provided by a resistor connected from the same power lead to which the first photo-resistive device is connected to said second junction.

3. A detector as set out in claim 1 in which said first junction is connected to the same lead of the power source as the resistor by a second resistor having a value substantially greater than that of the second photo-resistive device when illuminated by the light source.

4. A detector for providing a signal when a medium to be detected reaches a predetermined concentration, comprising a light source, a first photo-resistive device positioned to receive substantially only light from the light source reflected from the medium, a second photo-resistive device positioned to receive light directly from the light source, power leads and a signal lead, said photo-resistive devices being connected in series with each other and a resistor across the power leads so that the first photo-resistive device is connected to the positive power lead and the resistor is connected to the negative power lead, forming a first junction between the two photo-resistive devices and a second junction between the second photo-resistive device and the resistor, said signal lead being connected to the first junction, the voltage at said first junction rising to a first predetermined voltage when said first photo-resistive device is illuminated by light from the light source reflected from a medium of said predetermined concentration, and means maintaining said second junction at a second predetermined voltage such that a continuous stand-by voltage is maintained, through the illuminated second photo-resistive device, at the first junction, the second predetermined voltage being appreciably less than the first predetermined voltage.

5. A detector as set out in claim 4 in which the stand-by voltage at said second junction is provided by a resistor connected from the positive power lead to said second junction.

6. A detector as set out in claim 4 in which said first junction is connected to the negative power lead by a resistor having a resistance at least several times that of the resistance of the second photo-resistive device when illuminated by the light source, whereby on failure of the light source, the voltage at the first junction drops to zero.

* * * * *